US008082593B2

(12) United States Patent
Sarioglu et al.

(10) Patent No.: US 8,082,593 B2
(45) Date of Patent: Dec. 20, 2011

(54) ATOMIC FORCE MICROSCOPY DEVICES, ARRANGEMENTS AND SYSTEMS

(75) Inventors: Ali Fatih Sarioglu, Stanford, CA (US); Olav Solgaard, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 269 days.

(21) Appl. No.: 12/392,811

(22) Filed: Feb. 25, 2009

(65) Prior Publication Data

US 2010/0218288 A1    Aug. 26, 2010

(51) Int. Cl.
 *G01Q 20/02* (2010.01)
 *G01Q 60/24* (2010.01)
 *G01Q 60/34* (2010.01)
(52) U.S. Cl. ................. 850/6; 850/33; 850/38
(58) Field of Classification Search ............ 850/5, 6, 850/7, 33, 38, 40; 73/105
See application file for complete search history.

(56) References Cited

U.S. PATENT DOCUMENTS

| | | | |
|---|---|---|---|
| 5,908,981 A * | 6/1999 | Atalar et al. ............... | 73/105 |
| 6,935,167 B1 | 8/2005 | Sahin et al. | |
| 6,952,952 B2 | 10/2005 | Hinterdorfer et al. | |
| 7,089,787 B2 * | 8/2006 | Sahin et al. ............... | 73/105 |
| 7,137,291 B2 | 11/2006 | Mancevski | |
| 7,302,833 B2 | 12/2007 | Sahin et al. | |
| 7,404,314 B2 | 7/2008 | Sahin et al. | |
| 7,451,638 B1 | 11/2008 | Sahin et al. | |
| 2006/0283338 A1 | 12/2006 | Degertekin | |
| 2010/0175155 A1 | 7/2010 | Sahin | |

OTHER PUBLICATIONS

K. Yamanaka, H. Ogioso, and O. Kolosov, "*Ultrasonic force microscopy for nanometer resolution subsurface imaging*," Appl. Phys.Lett. 64 (2), Jan. 10, 1994.
S. Manalis, S. Minne, A. Atalar and C. Quate, "Interdigital cantilevers for atomic force microscopy", *Appl. Phys. Lett.*, 69, pp. 3944-3946, (1996).
A. Sarioglu and O. Solgaard, "*Cantilevers with integrated sensor for time-resolved force measurement in tapping-mode atomic force microscopy,*" Appl. Phys.Lett. 93, 023144 (2008).
A. Onaran, M. Balantekin, W. Lee, W. Hughes, B. Buchine, R. Guldiken, Z. Parlak, C. Quate, and F. Degertekin, "*A new atomic force microscope probe with force sensing integrated readout and active tip*," Rev. Sci. Instrum. 77, pp. 023501-023507 (2006) (abstract only).
O. Sahin, S. Magonov, C. Su, C. Quate, and O. Solgaard, "*An atomic force microscope tip designed to measure time-varying nanomechanical forces,*" Nat. Nanotechnol. 2, pp. 507-514 (2007) (abstract only).
G. Binnig, C. F. Quate, and C. H. Gerber, "*Atomic Force Microscope*," Phys. Rev. Lett. 56, No. 9, pp. 930-933 (1986).

(Continued)

*Primary Examiner* — Jack Berman
(74) *Attorney, Agent, or Firm* — Crawford Maunu PLLC

(57) ABSTRACT

Various embodiments of the present invention are directed to microscopy cantilevers. Consistent with an example embodiment, aspects of the invention are directed to a cantilever having a body and a force sensor arrangement extending from an end of the body and including a tip near a free end of the force sensor arrangement. The force sensor arrangement exhibits a high temporal response to the tip's interaction with a sample, relative to the response of the cantilever. The force sensor arrangement's response is detected and used to characterize the sample.

22 Claims, 12 Drawing Sheets

OTHER PUBLICATIONS

N. A. Burnham and R. J. Colton, "*Measuring the nanomechanical properties and surface forces of materials using an atomic force microscope,*" J. Vac. Sci. Technol. A 7 (4), pp. 2906-2913 (1989).

H. Krotil, T. Stifter, H. Waschipky, K. Weishaupt, S. Hild, and O. Marti, "*Pulsed Force Mode: a New Method for the Investigation of Surface Properties,*" Surf. Interface Anal. 27, pp. 336-340 (1999).

P. Maivald, H. J. Butt, S. A. C. Gould, C. B. Prater, B. Drake, J. A. Gurley, V. B. Elings, and P. K. Hansma, "*Using force modulation to image surface elasticities with the atomic force microscope,*" Nanotechnology 2, pp. 103-106 (1991).

Q. Zhong, D. Innis, K. Kjoller, and V. B. Elings, "*Fractured polymer/silica fiber surface studied by tapping mode atomic force microscopy,*" Surf. Sci. Lett. 290, pp. L688-L692 (1993).

J. Tamayo and R. Garcia, "*Effects of elastic and inelastic interactions on phase contrast images in tapping-mode scanning force microscopy,*" Appl. Phys. Lett. 71 (16), pp. 2394-2396 (1997).

R. W. Stark and W. M. Heckl, "*Higher harmonics imaging in tapping-mode atomic-force microscopy,*" Rev. Sci. Instrum. 74, No. 12, pp. 5111-5114 (2003).

A. G. Onaran, M. Balantekin, W. Lee, W. L. Hughes, B. A. Buchine, R. O. Guldiken, Z. Parlak, C. F. Quate, and F. L. Degertekin, "*A new atomic force microscope probe with force sensing integrated readout and active tip,*" Rev. Sci. Instrum. 77, pp. 023501-1-7 (2006).

O. Sahin, S. Magonov, C. Su, C. F. Quate, and O. Solgaard, "*An atomic force microscope tip designed to measure time-varying nanomechanical forces,*" Nat. Nanotechnol. 2, pp. 507-514 (2007).

M. Stark, R. W. Stark, W. M. Heckl, and R. Guckenberger, "*Inverting dynamic force microscopy: From signals to time-resolved interaction forces,*" Proc. Natl. Acad. Sci. U.S.A. vol. 99, No. 13, pp. 8473-8478 (2002).

J. Legleiter, M. Park, B. Cusick, and T. Kowalewski, "*Scanning probe acceleration microscopy (SPAM) in fluids: Mapping mechanical properties of surfaces at the nanoscale,*" Proc. Natl. Acad. Sci. U.S.A. 103, No. 13, pp. 4813-4318 (2006).

O. Sahin, A. Atalar, C. F. Quate, and O. Solgaard, "*Resonant harmonic response in tapping-mode atomic force microscopy,*" Phys. Rev. B 69, pp. 165416-1-9 (2004).

S. N. Magonov, J. Cleveland, V. Elings, D. Denley, and M.-H. Whangbo, "*Tapping—mode atomic force microscopy study of the near-surface composition of a styrene-butadience-styrene triblock copolymer film,*" Surf. Sci. 389, pp. 201-211 (1997).

\* cited by examiner

← 200

ATOMIC FORCE MICROSCOPY DEVICES, ARRANGEMENTS AND SYSTEMS

FEDERALLY-SPONSORED RESEARCH AND DEVELOPMENT

This invention was made with Government support under contract 0425897 awarded by the National Science Foundation. The Government has certain rights in this invention.

FIELD OF THE INVENTION

The present invention relates generally to microscopy, and more particularly to devices, arrangements and systems for atomic force microscopy.

BACKGROUND

The atomic force microscope is widely used for nanoscale surface characterization. There is an increasing interest in its use for mapping of material specific surface properties. Quasistatic methods, such as nanoindentation, and several dynamic methods, such as ultrasonic force microscopy, pulsed-force microscopy, and force modulation microscopy, have been developed for local stiffness measurements. These techniques generally suffer from low operational speeds and require large forces applied to the surface under test, limiting their use on soft materials such as biological samples.

Tapping-mode atomic force microscopy (AFM) is an often-used operational mode, which is particularly useful for soft samples. In tapping-mode, phase information and higher harmonic signals can be used to obtain nanoscale maps of material characteristics. Measurement of tip-sample interaction forces is a more direct method for material characterization. Recently, measurements of tip-sample interaction have been demonstrated by specially designed probes. However, these approaches have included structural components that generally limit the ability to detect and/or characterize surfaces and, in some instances, the ability to characterize soft surfaces. Moreover, these approaches have been limited in the resolution that can be obtained, due to characteristics of the cantilevers and related structures that are used to interact with samples.

These and other issues have presented challenges to the implementation and design of AFM cantilevers and AFM microscopes.

SUMMARY

The present invention is exemplified in a number of implementations and applications, some of which are summarized below.

According to an example embodiment, a microscopy cantilever arrangement is implemented for detecting characteristics of a sample. The arrangement includes a cantilever body, a tip to interact with the sample, and a high-temporal resolution structure. The high-temporal resolution structure includes first and second portions, the first portion being coupled to and having an end extending freely from the cantilever body, the second portion being coupled to the tip, with the relative responses of the first and second portions being indicative of the interaction of the tip with a sample.

According to another example embodiment, an atomic force microscopy cantilever arrangement includes a cantilever body and a resonator arrangement coupled to and extending from an end of the cantilever body. The resonator arrangement includes a resonator and a tip structure that is coupled to a free end of the resonator for interacting with a sample. The resonator is flexibly responsive to the tip structure's interaction with a sample, with the response being detectable for use in characterizing the sample.

In connection with another example embodiment, an atomic force microscope arrangement includes a supporting structure to hold a sample, a cantilever arrangement, an oscillatory device, a light source and a light detector. The cantilever arrangement includes a cantilever body and a resonator arrangement coupled to and extending from an end of the cantilever body. The resonator arrangement includes a resonator and a tip that is coupled to the resonator for interacting with a sample. The resonator (or a portion thereof) flexibly displaces, relative to the cantilever body (and, e.g., another portion of the resonator that representatively follows the motion of the cantilever body), in response to interaction between the tip and the sample. The oscillatory device applies oscillations to the cantilever arrangement to facilitate the interaction and detection thereof. The light source directs light to the resonator, and the light detector detects light that is reflected from the resonator and further provides an output characterizing the detected light. This output can be used as an indication of the tip's interaction with the sample (via displacement of the resonator), to characterize the sample.

According to another example embodiment of the present invention, a method for imaging via atomic force microscopy is carried out as follows, using a cantilever arrangement having a cantilever body and a resonant tip structure extending from the cantilever body. The resonant tip structure includes a resonator and a tip coupled to the resonator. The cantilever arrangement is oscillated at a resonant frequency, and the tip is interacted with a sample to cause the deflection of a portion of the resonator, relative to the cantilever body. The relative deflection of the resonator is detected and used to characterize the sample.

The above summary is not intended to describe each illustrated embodiment or every implementation of the present invention. The figures and detailed description that follow more particularly exemplify certain embodiments.

BRIEF DESCRIPTION OF THE DRAWINGS

The invention may be more completely understood in consideration of the detailed description of various embodiments of the invention that follows in connection with the accompanying drawings, in which.

Figure 1:
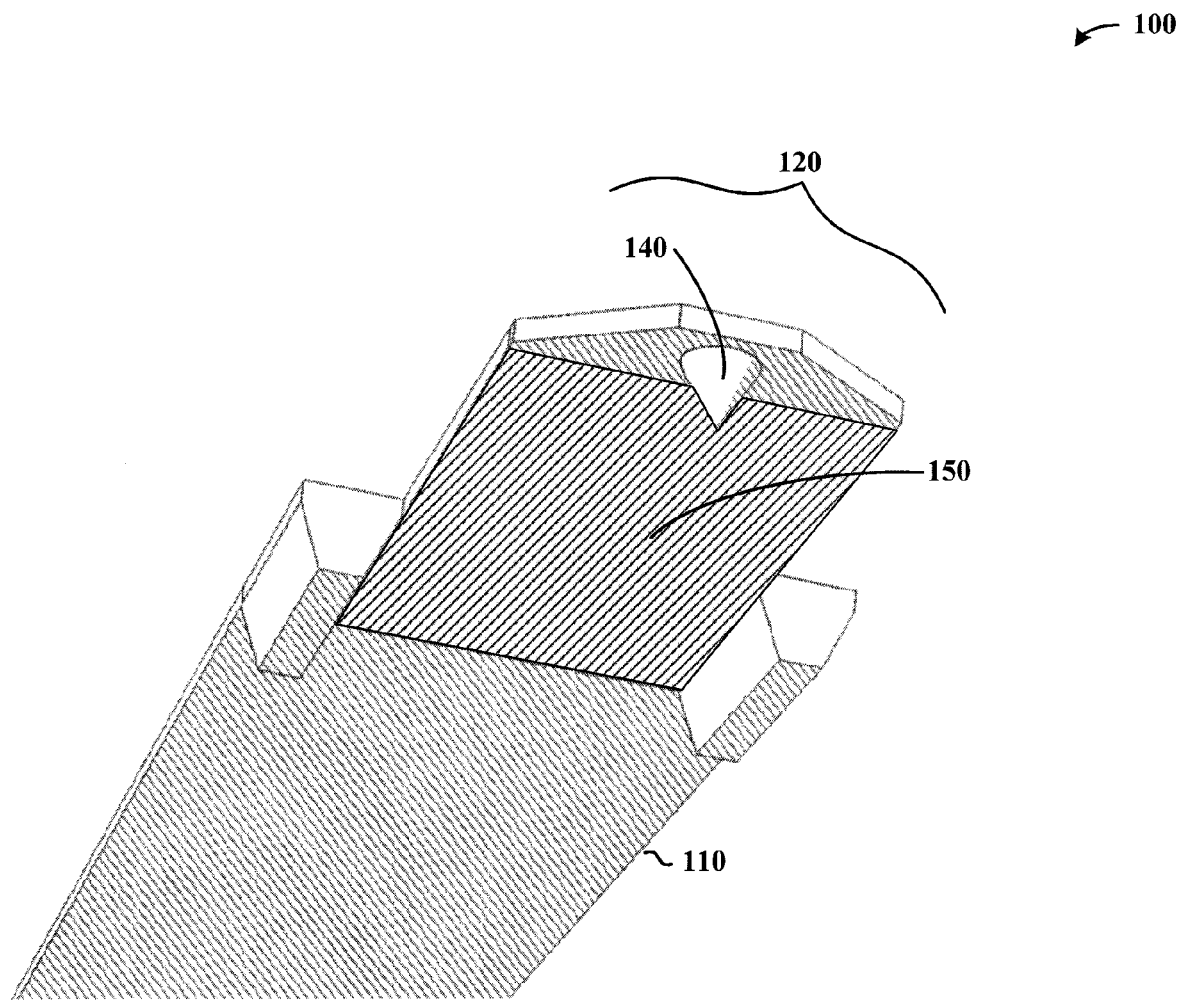
FIG. 1 shows an atomic force microscopy (AFM) arrangement including a cantilever with an integrated force sensor, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular example embodiments described and claimed. On the contrary, the intention is to cover all modifications, equivalents, and alternatives falling within the spirit and scope of the invention.

DETAILED DESCRIPTION

The present invention is believed to be useful for a variety of different microscopy applications, and has been found to be particularly suited for applications involving atomic force microscopy. While the present invention is not necessarily limited to such applications, various aspects of the invention may be appreciated through a discussion of several examples using this context.

According to an example embodiment, a microscopy cantilever arrangement includes a cantilever body and a sensor tip structure at an end of the cantilever body. The tip structure is highly responsive to mechanical interactions, relative to the cantilever body, when implemented for interacting with a sample for microscopy. For example, the sensor tip structure may deflect under rapidly varying forces between the tip and the sample, while the cantilever remains relatively stationary (or exhibits a lesser rate of deflection).

The tip structure includes an integrated force sensor to detect interaction response of the tip structure, such as for sensing or observing tip motion relative to the cantilever body. The sensor tip structure facilitates the observation/detection of tip-sample interactions with a desirably high signal-to-noise ratio.

The tip structure is of a shape and/or composition that facilitates response to tip-sample interaction at higher resolution, relative to such a response of the cantilever body (or a portion of the tip structure that moves with the cantilever body), in a manner that enhances time-resolved measurement of tip-sample interaction forces. Such an approach is useful, for example, in tapping-mode AFM. Harmonic images can be obtained for samples containing materials with different mechanical properties (e.g., using the tip structure to detect tip-interaction response independently from the cantilever body response, in order to detect one or more harmonic interactions with the sample).

According to another example embodiment, a micro-machined cantilever includes an integrated high-bandwidth resonator for detection (i.e., direct measurement) of tip-sample interaction forces in AC-mode atomic force microscopy (AFM). Force measurements are achieved by a diffraction grating that serves as a differential displacement sensor for the tip motion relative to the cantilever body. In some implementations, the harmonics of periodic tip-sample interaction are utilized via lock-in detection to obtain high-contrast, material-specific images.

In another example embodiment, a micro-machined cantilever arrangement includes a cantilever body and an integrated high-bandwidth force sensor-tip that facilitates time-resolved detection/measurement of interaction forces between the tip and a sample. The sensor-tip includes a mechanical structure that is thinner, relative to the cantilever body, and accordingly exhibits a greater (i.e., faster) response to interactions with a sample, relative to the response of the cantilever body. The integrated sensor detects and uses the response of the sensor-tip to facilitate high-bandwidth interaction detection (e.g., high-bandwidth as relevant to greater sensitivity). In many embodiments, the force constant of the force sensor-tip is set independently of the cantilever body.

In one embodiment, the force sensor includes a small and stiff mechanical resonator connected to the cantilever body, and exhibits temporal resolution that facilitates the observation/detection of tip-sample interactions. The cantilever body is generally softer than the force sensor and accordingly limits the amount of repulsive force applied to the surface, facilitating tip-sample interaction with relatively soft samples. The cantilever body is also configured to provide an oscillation amplitude for the force sensor to interact with the surface in a tapping-mode configuration.

Another example embodiment is directed to detecting sub-surface characteristics with a cantilever/sensor arrangement as described herein. The above-described sensor-tip can be interacted with a soft sample (e.g., as a biological sample, or biomolecules tethered to a surface), and the response of the tip is used as an indication of a sub-surface characteristic of the sample. For example, high-bandwidth interaction of the sensor-tip with a sample having a relatively stiff material underlying a surface of the sample can be different from such interaction with a surface having a relatively soft material underlying the surface. Accordingly, the response of the tip is used to detect such sub-surface characteristics.

While various embodiments described herein are directed to resonator-based force sensors, it should be appreciated that the indicated resonator may be implemented using one or more different types of sensors or sensor arrangements. For instance, the sensors may include one or more of piezoelectric sensors, piezoresistive sensors, magnetic devices, interferometers, optical sensors, capacitive sensors, diffractive gratings or other sensors that produce a modulated signal relative to displacement. Such sensors may, for example, be implemented in connection with those shown in the figures (e.g., interchangeably with force sensor end 120 of FIG. 1, discussed below). In addition, such sensors may be combined with and/or include detectors that can be used to detect forces that are sensed via optical, electrical, magnetic or other types of detection. Moreover, the cantilever bodies and/or sensor types described herein may include one or more of a variety of types of material and material arrangements, such as silicon, silicon-on-insulator or silicon nitride material. For general information regarding cantilever-based applications, and for specific information regarding aspects of sensor-type arrangements that may be implemented in connection with one or more example embodiments, reference may be made to U.S. Pat. No. 7,137,291 (to Mancevski), and U.S. Patent Publication No. 2006/0283338 (to Degertekin), which are fully incorporated herein by reference.

Turning now to the figures, FIG. 1 shows a cantilever arrangement 100 having an integrated force sensor-tip arrangement, according to another example embodiment of the present invention. The arrangement 100 includes a cantilever body 110 and a force sensor end 120 coupled to an end of the cantilever body 110, with the force sensor end having a tip structure 140 for interacting with a sample. The force sensor end 120 is generally configured and arranged, relative to the cantilever body 110, to respond with greater sensitivity to sample interaction. In many implementations, the freely-extending nature of the force sensor end addresses problems, including those discussed above, relating to sensor tip location and connectivity.

In one embodiment, the force sensor end 120 includes a high-temporal resolution structure that includes first and second portions that respectively follow the movement of the cantilever body and the tip structure 140. That is, the first portion more closely follows the action of the cantilever body 110, while the second end portion deflects or otherwise reacts more readily. The force sensor end 120 also includes a force sensor device (exemplified at 150), which is coupled to or forms part of the high-temporal resolution structure for detecting an interaction of the tip with a sample (and, in some implementations, includes the aforesaid first and second portions). Such a sensor may employ one or more of optical, electrical or other sensing mechanisms that are responsive to interaction between the tip 140 and a sample.

Figure 2A:
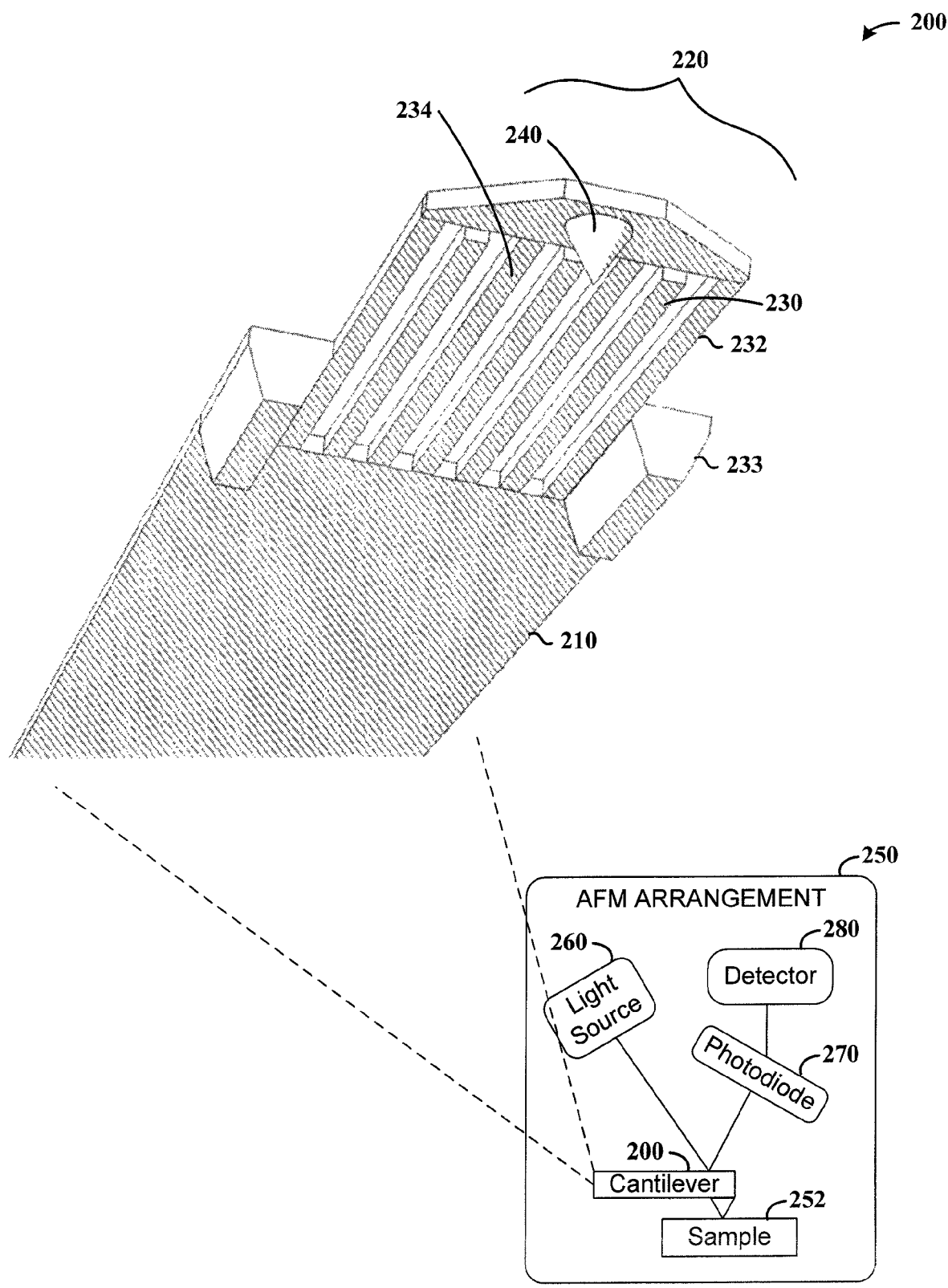
FIG. 2A shows an AFM arrangement including a cantilever with an integrated force sensor, according to another example embodiment of the present invention.
Figure 2B:
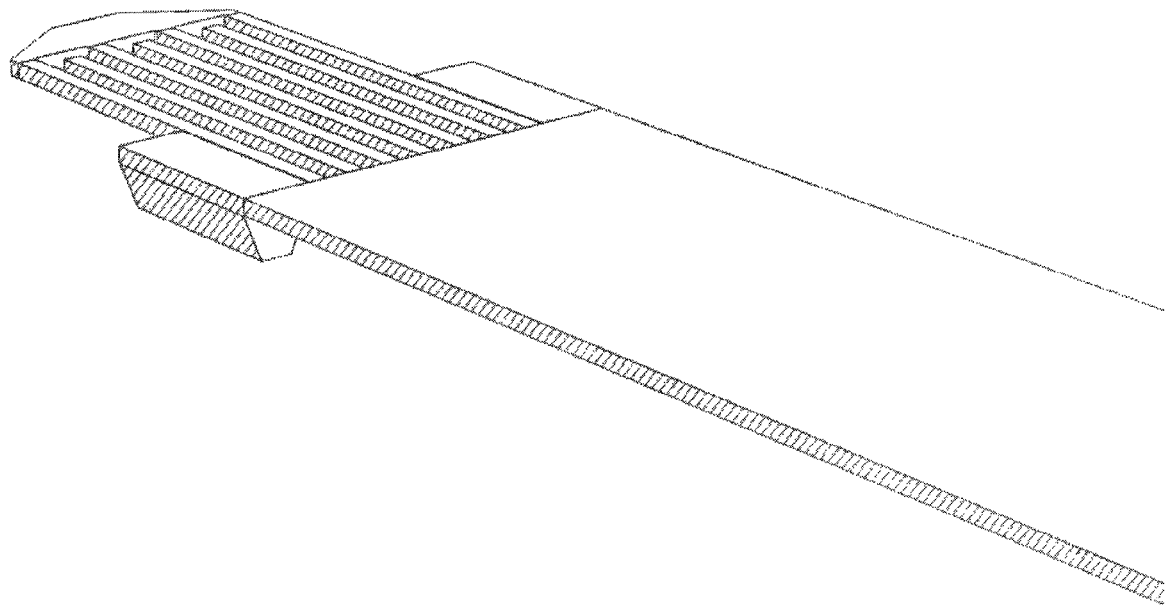
FIG. 2B shows a top perspective view of the arrangement shown in FIG. 2A.
Figure 2C:
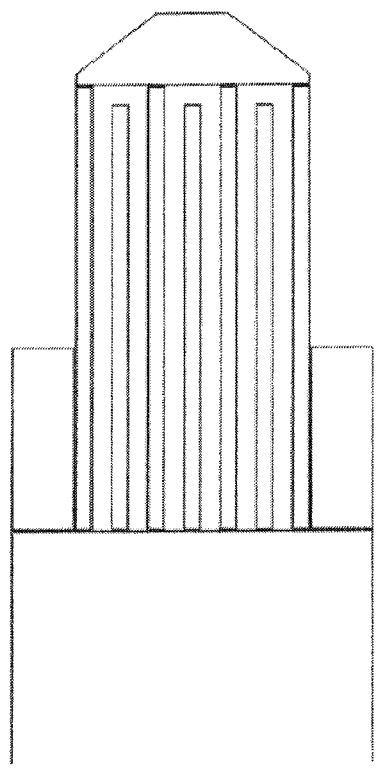
FIG. 2C shows a top view of the arrangement shown in FIG. 2A.

FIG. 2A shows a cantilever arrangement 200 having a cantilever body 210 and an integrated interferometric force sensor, according to another example embodiment of the present invention. FIG. 2B and FIG. 2C respectively show top-perspective and top views of the arrangement 200. A small resonator arrangement 220 on the cantilever has a phase-sensitive diffraction grating that serves as a relative displacement sensor for tip motion. Specifically, the resonator arrangement 220 includes a resonator having respective fingers extending from the cantilever body 210, with a free-end finger 230 and fixed-end finger 232 shown by way of example. The fixed-end finger 232 is coupled to a tip portion 240 that interacts with a sample, such that it interacts with the tip portion 240, while the free-end finger 230 follows the action of the cantilever body 210. That is, while both fingers 230 and 232 are coupled to the cantilever body, the free-end finger 230 exhibits a reaction to interaction of the tip 240 with a sample that is consistent with the reaction of the cantilever body, whereas the fixed-end finger 232 follows the tip. The relative reactions of the fingers 230 and 232 provide an indication of the interaction of the tip portion 240 with a sample that can be relatively independent from the cantilever reaction.

The cantilever arrangement 200 can be implemented with various compositions and spatial dimensions. In one implementation, the cantilever arrangement 200 is 370 µm long, 60 µm wide and 2.5 µm thick. The sensor 220 includes grating fingers (e.g., 230, 232) that may respectively be implemented at 3 µm wide and 70 µm long.

In another implementation, the cantilever arrangement 200 is used in an AFM arrangement 250 as shown in the inset of FIG. 2A. The AFM arrangement 250 includes the cantilever arrangement 200 for detecting surface characteristics of a sample 252. The AFM arrangement 250 also includes a light source 260 that illuminates the cantilever arrangement 200, a photodiode 270 that receives reflected illumination light from the cantilever arrangement, and a detector circuit 280 that processes an output from the photodiode 270. The detector circuit 280 may include a computer-type processor and/or communicate with an external computer, and therein provides information characterizing the light received at the photodiode 270 (e.g., for characterizing the intensity of the light receive at the photodiode). Such an AFM arrangement may include, for example, an atomic force microscope such as the Agilent 5500 atomic force microscope, available from Agilent Technologies of Santa Clara, Calif.

The cantilevers as described herein are operated in one or more of a variety of manners. In one embodiment, a cantilever arrangement with an integrated high-bandwidth force sensor (e.g., 200 of FIG. 2A) is driven close to its fundamental resonance frequency. During a small fraction of the oscillation cycle, the tip portion 240 interacts with a sample. The relatively small force sensor (resonator 220) exhibits a high-bandwidth response to the interaction force, whereas the cantilever (body) is larger and does not follow the interaction in the same manner, exhibiting a relatively low-bandwidth response. Under these differing response conditions of the respective cantilever body and force sensor, the relative position of the diffractive grating fingers changes, with the free-end fingers following the cantilever body and the fixed-end fingers following the tip, modifying the amount of light reflected from the sensor in diffracted modes (e.g., when used as shown in AFM arrangement 250). The light intensity variation in the diffracted modes is detected and used to characterize or otherwise observe the tip-sample interactions.

Relatively high temporal resolution is accordingly achieved via the relative reduction of the displaced mass (the sensor/tip), facilitating a desirable signal-to-noise ratio (SNR). In addition, the interdigitated fingers (e.g., 230, 232 of FIG. 2A) exhibit differential interferometric measurement, mitigating crosstalk between cantilever oscillations and tip motion.

The force sensors (e.g., 220 of FIG. 2A) are arranged in shape and composition to suit various applications, and in connection with various example embodiments. In some embodiments, interdigitated fingers of a differential sensor are fabricated such that the adjacent fingers have $\lambda/8$ offset, where $\lambda$ is the illumination wavelength of light used to illuminate the fingers. This approach facilitates desirable sensitivity and linearity for measuring weak tip-sample interaction that causes small relative displacements on the order of 1 nm or less.

For certain embodiments, the force sensor includes reference fingers and fingers connected to the tip that are designed to exhibit (about) equal resonance frequencies, to mitigate coupling between flexural resonances of the cantilever and the force sensor (i.e., by comparing relative displacement of fixed and free fingers, response characteristics of the cantilever body can be canceled). Accordingly, the force sensor can be modeled as a simple harmonic oscillator. In some implementations, the resonance frequencies of adjacent fingers are equalized by using thick support regions around the outer fingers to effectively shorten the fingers connected to the tip, relative to the freely-extending figures. Referring again to FIG. 2A, such an implementation is effected as shown by outer finger 232 (connected to the tip end 240) having a relatively thick portion 233 at its connection to the cantilever base 210, relative to the thickness of the inner fingers (e.g., 230, 234). The effective length of the coupled and uncoupled fingers, relative to the cantilever body, can be thus equalized.

Cantilever arrangements as described herein are manufactured using one or more of a variety of approaches. In one example embodiment, cantilevers are fabricated using optical lithography in a four-mask process involving wafer bonding, using silicon-on-insulator (SOI) wafers with 10 µm device layers. First, an offset between grating fingers is defined using local oxidation of silicon. A 40 nm thick $SiO_2$ layer is grown, followed by an 80 nm $Si_3N_4$ deposition. The nitride layer is patterned and followed by an oxidation process that removes silicon from areas that are not covered with silicon nitride, without affecting the surface roughness. After removal of nitride and oxide layers, another silicon wafer with thermal oxide is fusion-bonded to the SOI device layer. The substrate of the SOI wafer is removed using tetramethylammonium hydroxide. The tips and the support regions are patterned in the oxide layer using 6:1 buffered oxide etch (BOE) and formed by undercutting $SF_6$ plasma etching. The tips are oxide sharpened at 950° C. The cantilever outline with sensor gratings is patterned in a plasma etch. The top surface is covered with tetraethyl orthosilicate and silicon nitride. The handle wafer is etched using KOH through a nitride mask from the backside. The structures are released in a nitride plasma etch followed by a 6:1 BOE etch.

Figure 3:
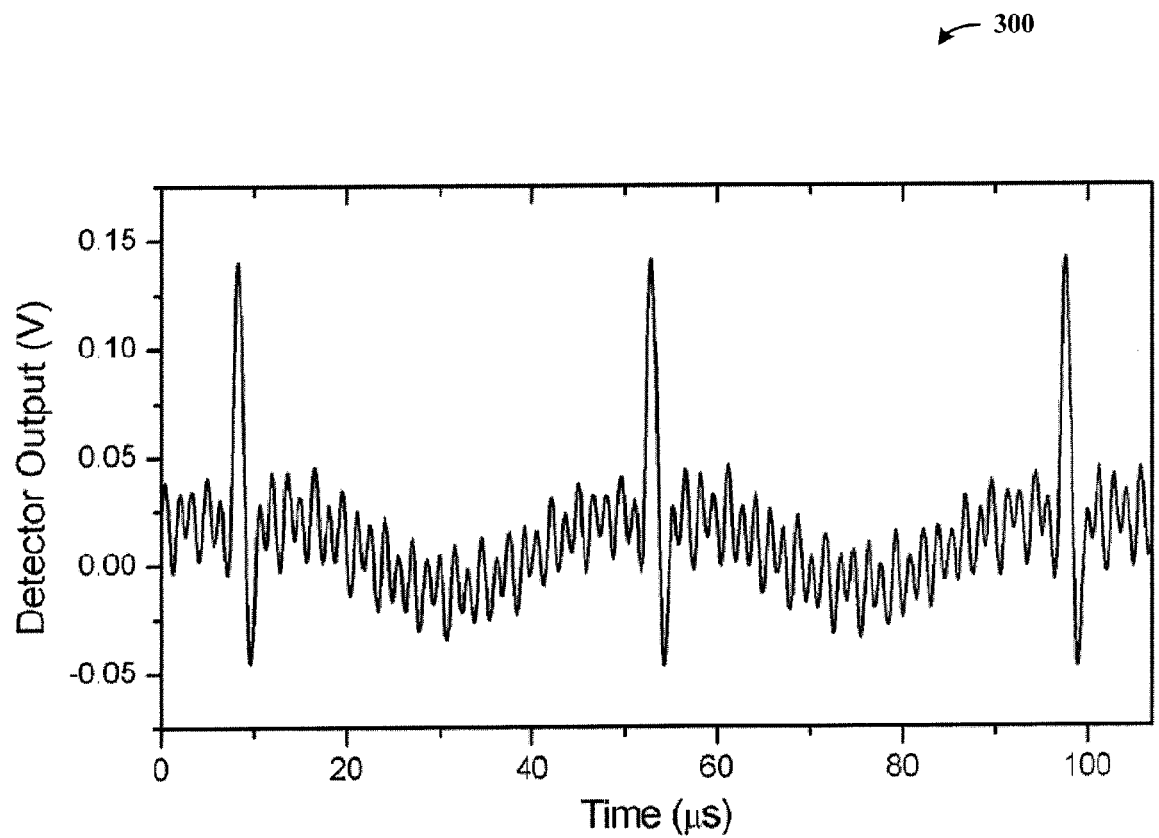
FIG. 3 shows a plot of example time-resolved interaction force measurements for an AFM arrangement, according to another example embodiment of the present invention.

FIG. 3 shows a plot 300 of example time-resolved interaction force measurements for an AFM arrangement, according to another example embodiment. The plot can be obtained using the following exemplary (e.g., experimental) conditions.

The cantilever is excited close to its fundamental resonance frequency at 22 kHz, and the resonance frequency of the force sensor is measured to be 672 kHz. A 690 nm laser light is focused to a 30×30 $\mu m^2$ spot on the integrated diffraction grating force sensor on the cantilever. The zeroth and first modes of the diffraction pattern are placed on each half of an external dual-cell photodiode. The individual cell outputs are subtracted from each other and low-pass filtered with a 1 MHz bandwidth. The ringing that is apparent in the trace of FIG. 3 is due to the resonance of the small force sensor and coupling of the force sensor to cantilever resonances.

Figure 4:
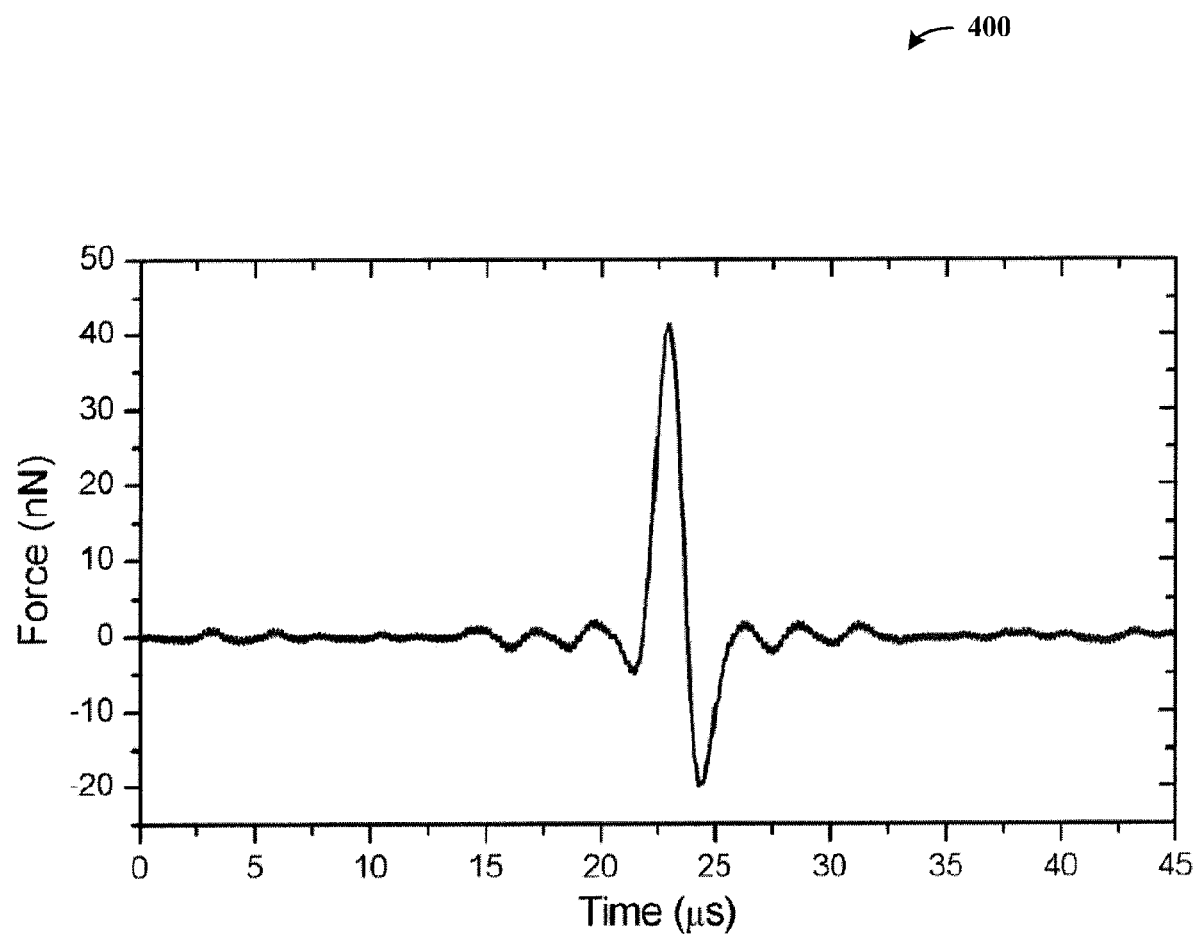
FIG. 4 shows a plot of the time-resolved force signal as in FIG. 3, following calibration and signal processing, according to another example embodiment of the present invention.

FIG. 4 shows a plot 400 of the time-resolved force signal as in FIG. 3, following calibration and signal processing in accordance with another example embodiment of the present invention. The effect of sensor resonance is compensated by inverse filtering the displacement signal, using one or more approaches (see, e.g., O. Sahin, S. Magonov, C. Su, C. F. Quate, and O. Solgaard, Nat. Nanotechnol. 2, 507 (2007); M. Stark, R. W. Stark, W. M. Heckl, and R. Guckenberger, Proc. Natl. Acad. Sci. U.S.A. 99, 8473 (2002); and/or J. Legleiter, M. Park, B. Cusick, and T. Kowalewski, Proc. Natl. Acad. Sci. U.S.A. 103, 4813 (2006)). To facilitate this compensation, the transfer function of the force sensor can be modeled as a damped, simple harmonic oscillator. The resonance frequency and the quality factor of the sensor are determined by sweeping the cantilever driving frequency. This facilitates observation of the sensor resonance, because a small mismatch between the resonance frequencies of the stationary and moving grating fingers causes relative displacement when the cantilever is driven close to the sensor resonance frequency. Correlating these approaches to the figures (by way of example), the grating fingers shown in FIG. 2A may accordingly be used to detect such a mismatch.

In some embodiments, the accuracy of the calibration parameters is confirmed by observing tip-sample rupture events. In addition to inverse filtering, nonlinear least square fitting is performed on the signal for time periods in which the tip is not in contact with the sample. During this process, the harmonics of the driving signal are used as the basis set. Together with inverse filtering, this removes errors caused by misplacement of the photodiode, photodetector nonlinearity, and coupling between flexural resonances of the cantilever and the force sensor (for optical applications).

Relative to the plots, the force constant of the cantilever is estimated by finite element analysis (e.g., to be 0.74 N/m). The force calibration of the integrated force sensor is performed by pressing the cantilever on a hard surface. The total force acting on the tip is calculated by multiplying the piezo-tube displacement with the estimated spring constant of the cantilever. The resulting change in the photodiode signal is measured.

Accordingly, the time-resolved force signal shown in FIG. 4 facilitates the identification of attractive, repulsive, and/or adhesive phases of the tip-sample interaction with microsecond (μs) time resolution. The results also exemplify hysteresis of tip-sample interaction.

According to another example embodiment, a cantilever such as shown in FIG. 2A is implemented in an atomic force microscope (e.g., as available from Agilent, cited above) by aligning a diffracted mode of the force sensor to the center of a quadrant photodiode, and blocking the others and/or arranging the photodiode so that the others fall outside of the photodiode. In this setting, the vertical displacement of the spot corresponds to cantilever oscillations and the total power on the quadrant photodiode corresponds to relative tip displacement due to interaction with the sample.

In another example embodiment, a cantilever such as shown in FIG. 2A is similarly implemented in an atomic force microscope by aligning two adjacent diffracted modes onto left and right halves of a quadrant photodiode, such that they are vertically centered. In this setting, the vertical difference signal corresponds to cantilever oscillations, and the lateral difference signal gives the tip displacement relative to the cantilever body. The differential measurement mitigates common mode noise due to laser diode intensity and wavelength instabilities, and two spatially-separated diffraction modes on the photodiode eliminate crosstalk between vertical and lateral signals in tapping-mode operation.

In tapping-mode AFM, the tip-sample interaction is quasiperiodic and the frequency spectrum includes harmonics of the cantilever excitation frequency. The tip-sample interaction depends on material parameters, so the amount of signal power at each harmonic can be controlled a function of sample properties. This contrast mechanism is used for obtaining material-specific AFM images.

Figure 5:
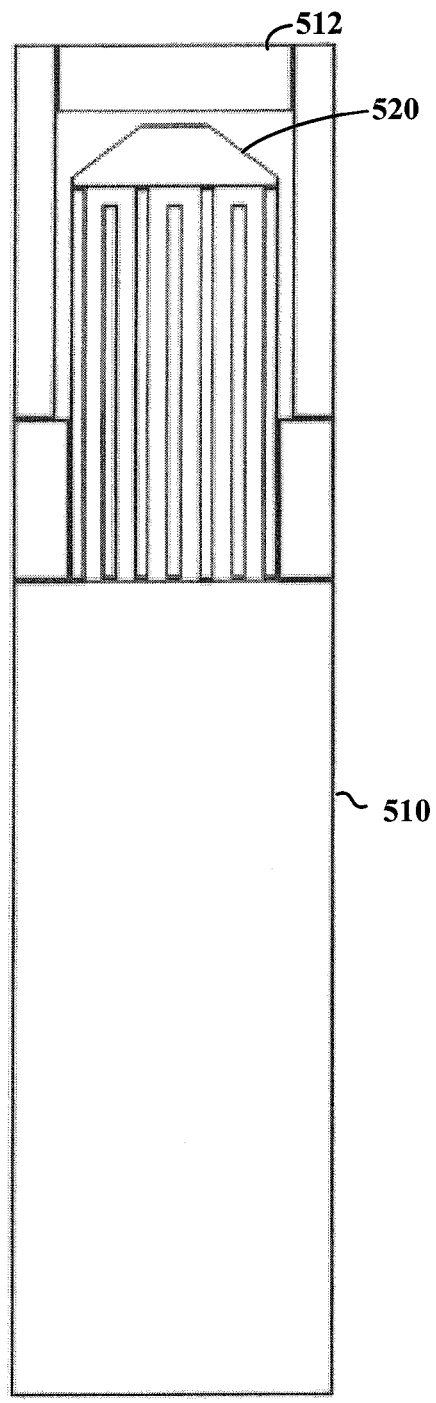
FIG. 5 shows a top view of an AFM arrangement including a cantilever with an integrated force sensor, according to another example embodiment of the present invention.

FIG. 5 shows a top view of an AFM arrangement 500 including a cantilever with an integrated force sensor, according to another example embodiment of the present invention. The arrangement 500 is similar to the arrangement 200 shown in FIG. 2A, with cantilever body 510 having a portion 512 that extends around sensor 520.

Figure 6:
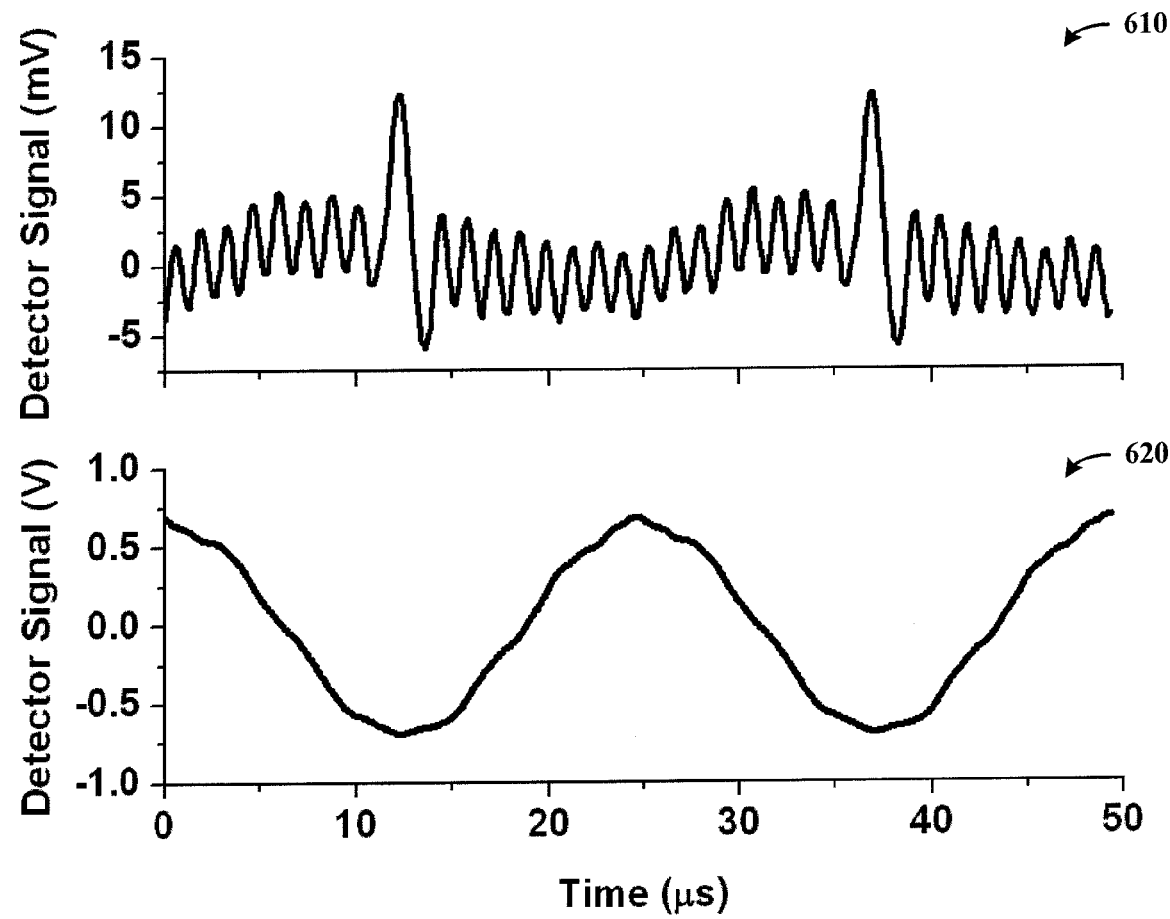
FIG. 6 shows plots for a signal obtained using a cantilever arrangement as described herein, according to another example embodiment.

FIG. 6 shows plots 610 and 620 for a signal obtained using a cantilever arrangement as described herein during AC-mode imaging, according to another example embodiment. The sensor used is about 17× (seventeen times) faster than the cantilever body and can resolve individual tapping events. The top plot 610 shows tip-sample interaction whereas the bottom plot 620 shows the cantilever oscillation. Interaction occurs when the cantilever is closer to the surface.

Figure 7:
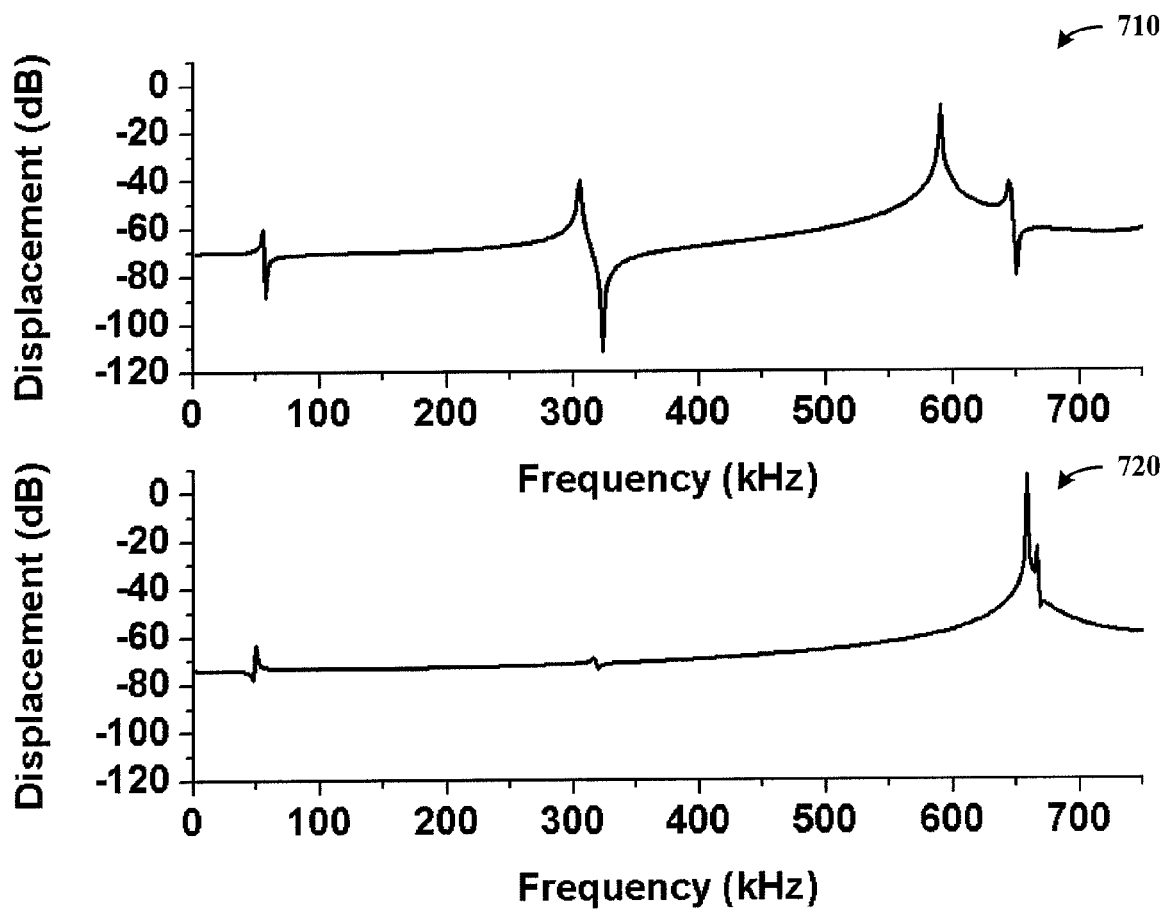
FIG. 7 shows plots for a signal obtained using a cantilever arrangement as described herein, according to another example embodiment.

FIG. 7 shows example plots 710 and 720 for a signal obtained using a cantilever arrangement such as described herein. Plot 710 shows a signal obtained from a force sensor without support regions (e.g., 233 in FIG. 2A), and plot 720 shows a signal (the transfer function) obtained with support regions. The sensor can be modeled as a simple harmonic oscillator for inverting the detector signal to interaction force.

Figure 8:
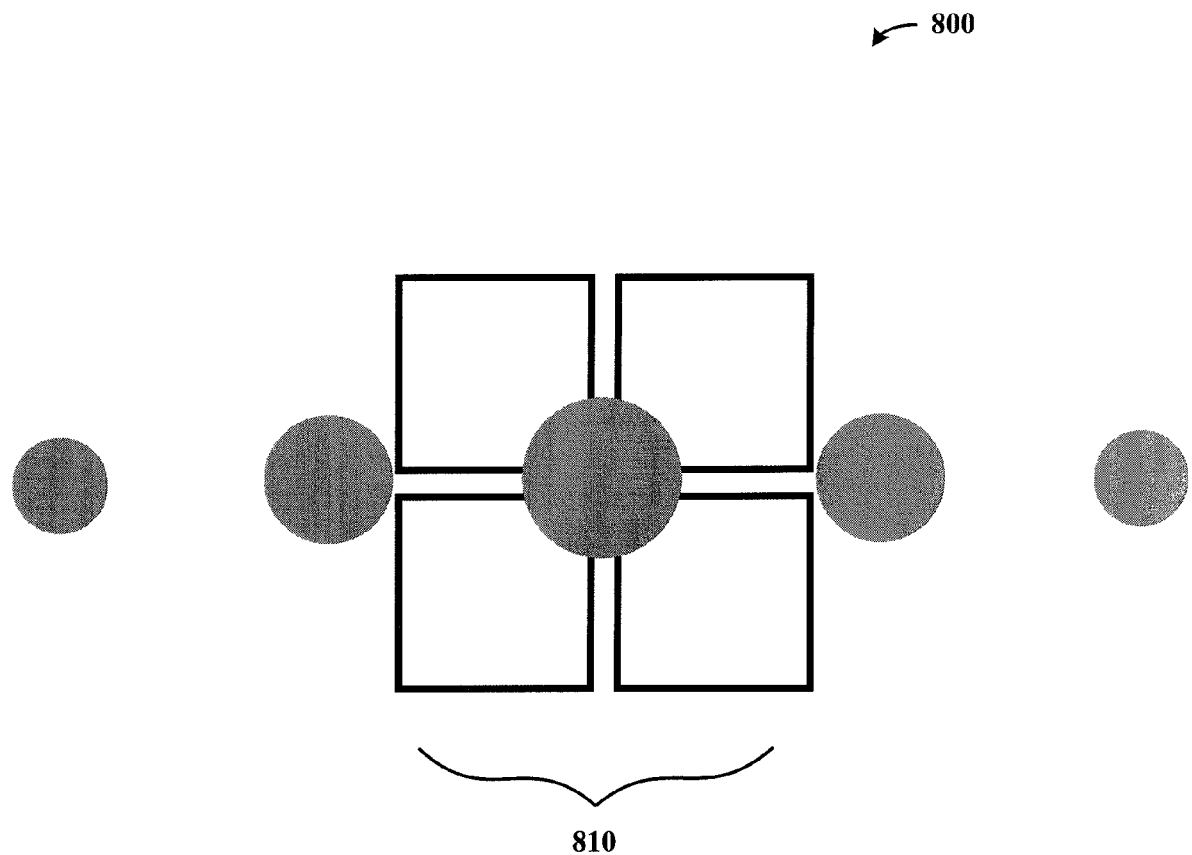
FIG. 8 shows an approach for placing diffracted spots from a grating onto a split photodetector, according to another example embodiment.
Figure 9:
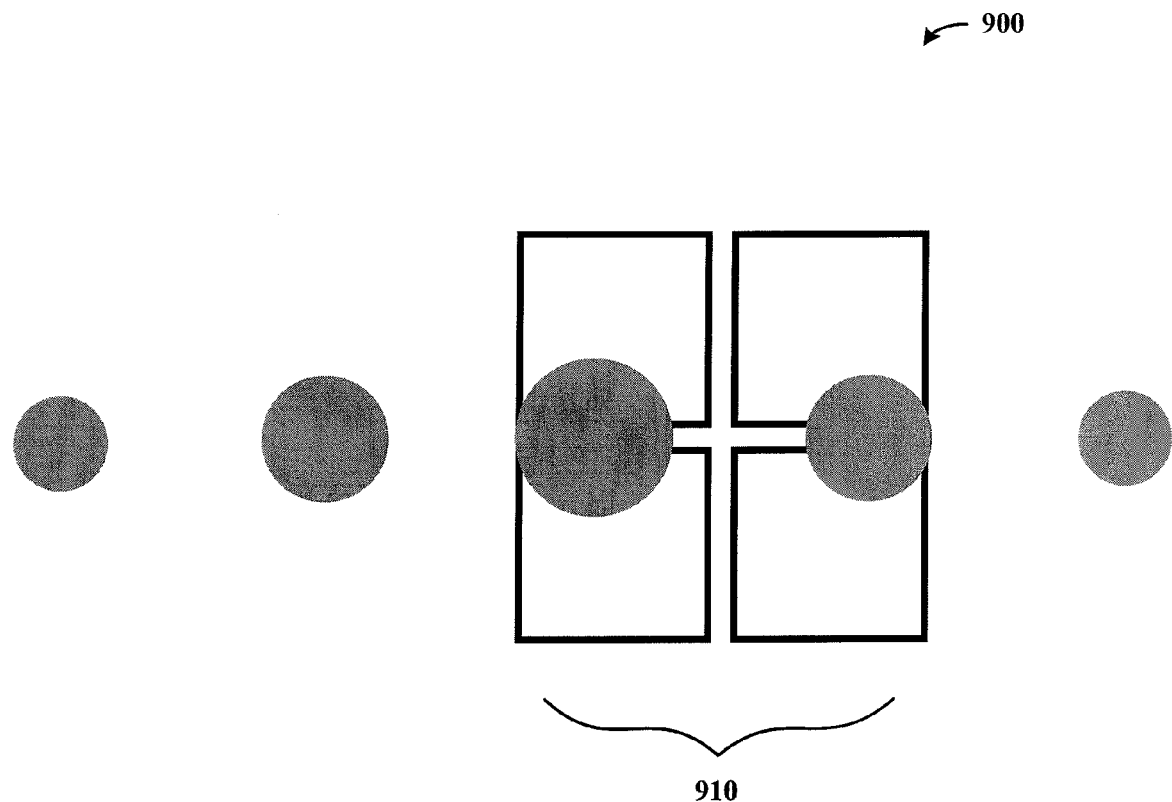
FIG. 9 shows another approach for placing diffracted spots from a grating onto a split photodetector, according to another example embodiment.

FIG. 8 and FIG. 9 respectively show two approaches (800, 900) of placing diffracted spots from a grating, on a split photodetector (e.g., from the grating/sensor 220 onto photodiode 270 in FIG. 2A). In FIG. 8, the total sum signal upon a photodetector 810 corresponds to tip-sample interaction, whereas the vertical displacement corresponds to cantilever oscillation. In FIG. 9, the lateral difference signal on a photodetector 910 corresponds to tip-sample interaction, whereas the vertical displacement corresponds to cantilever oscillation.

Figure 10:
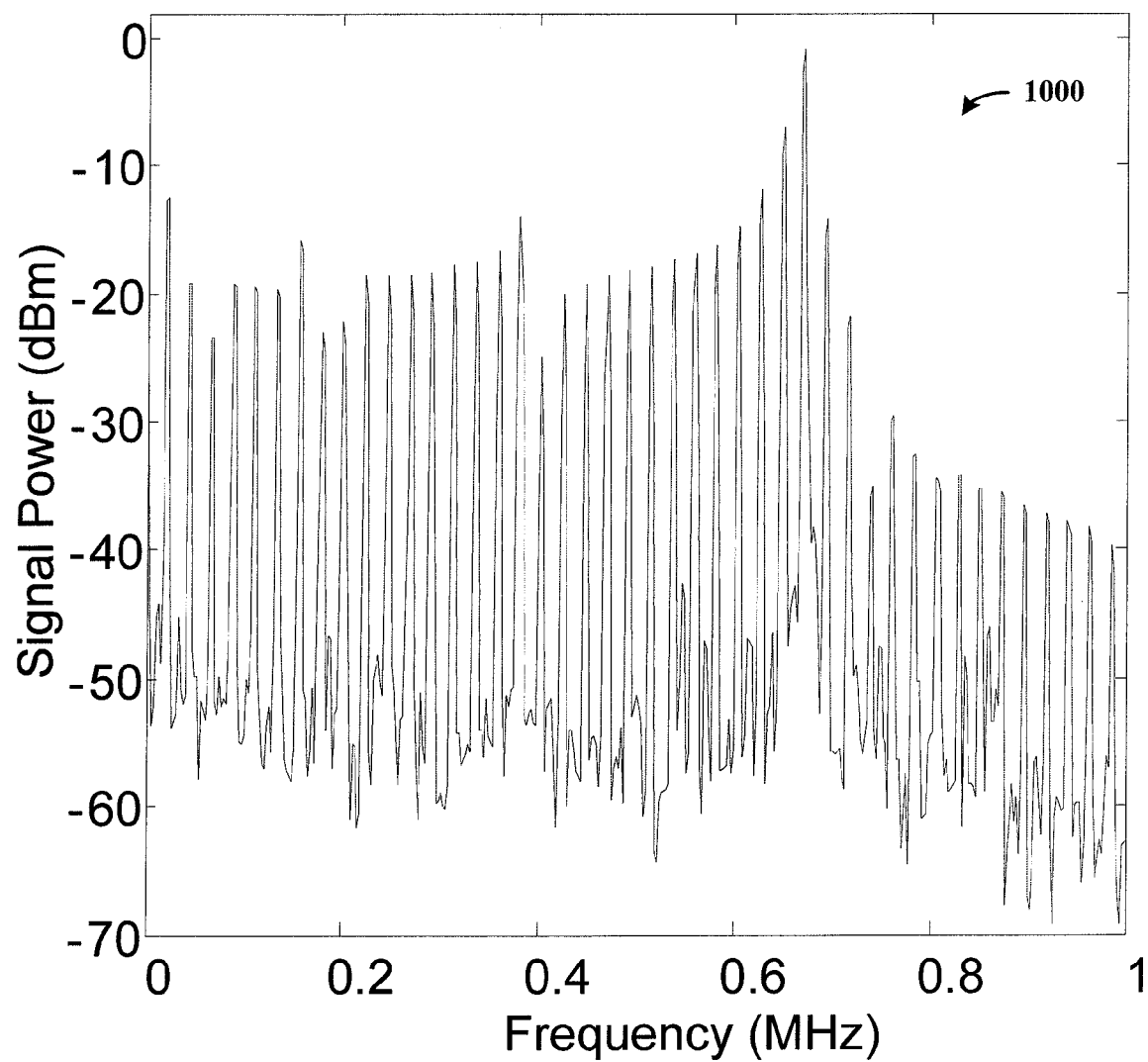
FIG. 10 shows a plot of the spectrum of a detector signal as obtained using a cantilever probe arrangement as described herein, in connection with another example embodiment.

FIG. 10 shows a plot 1000 of the spectrum of a detector signal as obtained using a cantilever probe arrangement as described herein, in connection with another example embodiment. Due to nonlinear quasi-periodic tip sample interaction, the detector signal contains harmonics of the drive frequency. All of the harmonics up to (and even beyond) the resonance frequency of the sensor can be obtained, using the high signal to noise ratio of the sensor.

REFERENCES

Various embodiments of the present invention may be implemented in connection with and/or using aspects of one or more of the following references, which are fully incorporated herein by reference.

1 G. Binnig, C. F. Quate, and C. H. Gerber, Phys. Rev. Lett. 56, 930 (1986).
2 N. A. Burnham and R. J. Colton, J. Vac. Sci. Technol. A 7, 2906 (1989).
3 K. Yamanaka, H. Ogiso, and O. Kolosov, Appl. Phys. Lett. 64, 178 (1994).
4 H. Krotil, T. Stifter, H. Waschipky, K. Weishaupt, S. Hild, and O. Marti, Surf. Interface Anal. 27, 336 (1999).
5 P. Maivald, H. J. Butt, S. A. C. Gould, C. B. Prater, B. Drake, J. A. Gurley, V. B. Elings, and P. K. Hansma, Nanotechnology 2, 103 (1991).
6 Q. Zhong, D. Innis, K. Kjoller, and V. B. Elings, Surf. Sci. Lett. 290, L688 (1993).
7 J. Tamayo and R. Garcia, Appl. Phys. Lett. 71, 2394 (1997)
8 R. W. Stark and W. M. Heckl, Rev. Sci. Instrum. 74, 5111 (2003)
9 A. G. Onaran, M. Balantekin, W. Lee, W. L. Hughes, B. A. Buchine, R. O. Guldiken, Z. Parlak, C. F. Quate, and F. L. Degertekin, Rev. Sci. Instrum. 77, 023501 (2006).
10 O. Sahin, S. Magonov, C. Su, C. F. Quate, and O. Solgaard, Nat. Nanotechnol. 2, 507 (2007).
11 S. R. Manalis, S. C. Minne, A. Atalar, and C. F. Quate, Appl. Phys. Lett. 69, 3944 (1996).
12 Agilent 5500 atomic force microscope, available from Agilent Technologies of Santa Clara, Calif.
13 M. Stark, R. W. Stark, W. M. Heckl, and R. Guckenberger, Proc. Natl. Acad. Sci. U.S.A. 99, 8473 (2002)
14 J. Legleiter, M. Park, B. Cusick, and T. Kowalewski, Proc. Natl. Acad. Sci. U.S.A. 103, 4813 (2006).
15 O. Sahin, A. Atalar, C. F. Quate, and O. Solgaard, Phys. Rev. B 69, 165416 (2004).
16 S. N. Magonov, J. Cleveland, V. Elings, D. Denley, and M.-H. Whangbo, Surf. Sci. 389, 201 (1997).

The various embodiments described herein are provided by way of illustration and should not be construed to limit the invention. Based upon the above discussion and illustrations, those skilled in the art will readily recognize that various modifications and changes may be made to the present invention without strictly following the exemplary embodiments and applications illustrated and described herein. For example, a variety of different force sensor finger arrangements, compositions and thicknesses may be used, in connection with a variety of different types of cantilevers or other oscillatory-type structures. Such applications may involve the use of different numbers of fingers, gratings or other resonant structures, similar to and/or different from those shown in FIG. 1 or in FIG. 2A, to achieve relative movement in conjunction with cantilever base-type structures. Similarly, the cantilever arrangements described herein may be implemented with various atomic force microscopes, including those described above as well as others, for characterizing a multitude of different types of samples. Other modifications include using different materials for the cantilever body and/or the sensor-type, such as silicon, silicon nitride, magnetic materials and others. Such modifications and changes do not depart from the true spirit and scope of the present invention, including that set forth in the following claims.

What is claimed is:

1. For detecting characteristics of a sample, a microscopy cantilever arrangement comprising:
a cantilever body;
a tip configured and arranged to interact with the sample; and
a high temporal resolution structure including first and second portions, the first portion being coupled to and having an end extending freely from the cantilever body, the second portion being coupled to the tip, the relative responses of the first and second portions and the cantilever being indicative of the interaction of the tip with a sample.

2. The arrangement of claim 1,
wherein the first and second portions form a diffractive grating structure,
the first portion having at least one grating finger coupled to and extending freely from the cantilever body, and configured and arranged to follow the movement of the cantilever body, and
the second portion having at least one grating finger coupled to both the cantilever body and the tip, and configured and arranged to follow the movement of the tip.

3. The arrangement of claim 1, wherein the high-temporal resolution structure is coupled to an end of the cantilever body and configured to couple force corresponding to interaction of the tip with the sample, to the first portion, second portion and cantilever body, the relative response of the first portion to the tip interaction being representative of the response of the cantilever body to the tip interaction.

4. The arrangement of claim 1, wherein the second portion extends away from the cantilever body and includes a free end to which the tip is coupled.

5. The arrangement of claim 1, wherein the high-temporal resolution structure includes at least one of silicon, silicon nitride, and a silicon-on-insulator structure.

6. An atomic force microscopy cantilever arrangement comprising:
a cantilever body;
a sensor arrangement, coupled to and extending from an end of the cantilever body, including
a mechanical resonator, and
a tip structure coupled to a free end of the mechanical resonator and configured and arranged to interact with a sample,
a first portion of the mechanical resonator being flexibly responsive to the tip structure's interaction with a sample, relative to the response of a second portion of the mechanical resonator to the tip structure's interaction with the sample to thereby cause the movement of the second portion along with the cantilever body.

7. The arrangement of claim 6, further including a light detector configured and arranged to detect light reflected from the mechanical resonator and to provide a signal corresponding to the light for use in characterizing the displacement of the mechanical resonator in response to the interaction between the tip and the sample.

8. The arrangement of claim 6, wherein the mechanical resonator includes a grating structure including the first and second portions, the second portion having at least one uncoupled resonator finger extending freely from the cantilever body, and including the first portion having at least one coupled resonator finger coupled to both the cantilever body and the tip structure, the coupled resonator finger being configured and arranged to flexibly displace, relative to the uncoupled resonator finger, in response to interaction between the tip and sample, the relative displacement of the resonator fingers providing a detectable indication of the interaction between the tip and sample.

9. The arrangement of claim 6, further including a thick base region at the first portion of the resonator that is coupled to the cantilever body, the first portion being configured and arranged, with the thick base region, to exhibit a resonance frequency that is about equal to a resonance frequency exhibited by the second portion.

10. The arrangement of claim 6, wherein the mechanical resonator is configured and arranged to exhibit a temporal response to mechanical interaction that is higher than the temporal response of the cantilever body to mechanical interaction, and wherein the force sensor detects the response of the mechanical resonator to interaction between the tip and the sample, relative to the response of the cantilever body to the interaction between the tip and the sample.

11. An atomic force microscope arrangement comprising:
a structure to hold a sample;
a cantilever arrangement including a cantilever body and a sensor arrangement coupled to and extending from an end of the cantilever body, the sensor arrangement including a mechanical resonator and a tip that is coupled to the mechanical resonator and configured and arranged to interact with a sample, the mechanical resonator including first and second portions, the first portion being connected to the tip and configured and arranged to flexibly displace, relative to the cantilever body, in response to interaction between the tip and the sample, and the second portion being connected to and configured and arranged to move with the cantilever body in response to said interaction, the resonance of the first and second portions being about equal;
an oscillatory device to apply oscillations to the cantilever arrangement;
a light source to direct light to the resonator; and
a light detector to detect reflected light from the mechanical resonator and to provide an output characterizing the detected light, the detected light providing an indication of the tip's interaction with the sample via the relative displacement of the mechanical resonator.

12. The arrangement of claim 11, further including a computer processor coupled to receive the output from the light detector and to process the output to generate data that characterizes the surface of the sample.

13. The arrangement of claim 11, wherein
the mechanical resonator includes
a first end coupled to the cantilever body, and
a second end that extends freely away from the cantilever body, the tip being coupled to the first portion at the second end, and
the light detector detects the tip's interaction with the sample by detecting the flexible displacement of the first portion of the resonator coupled to the tip, relative to the second portion of the resonator that is not coupled to the tip.

14. The arrangement of claim 11, wherein
the mechanical resonator includes a diffractive grating structure having at least one uncoupled grating finger in the second portion extending freely from the cantilever body and at least one coupled grating finger in the first portion and coupled to both the cantilever body and the tip, the coupled grating finger exhibiting a response to the interaction of the tip and the sample that causes a change in relative position of the fingers, and
the light detector detects the relative position of the diffractive grating fingers by detecting the reflected light intensity in diffracted modes.

15. The arrangement of claim 11, wherein
the mechanical resonator includes interdigitated fingers, adjacent ones of the fingers having a $\lambda/8$ offset where $\lambda$ is the wavelength of light directed by the light source,
the interdigitated fingers include
coupled fingers in the first portion that are coupled to both the tip and the cantilever body, and
uncoupled fingers in the second portion that are coupled to and extend freely from the cantilever body, and
the coupled fingers having a support region where the fingers are coupled to the cantilever body to set the resonance frequency of the coupled fingers to the resonant frequency of the uncoupled fingers.

16. A method for imaging via atomic force microscopy, the method comprising;
oscillating a cantilever arrangement at a resonant frequency, the cantilever arrangement including a cantilever body and a sensor arrangement extending from an end of the cantilever body, the sensor arrangement including a force sensor and a tip coupled to a free end of the force sensor;
interacting the tip with a sample to cause the deflection of the cantilever body and of a portion of the force sensor, relative to the deflection of the cantilever body;
detecting the relative deflection of the force sensor; and
using the detected deflection to characterize the sample.

17. The method of claim 16, wherein interacting the tip with a sample to cause the deflection of a portion of the force sensor includes causing the deflection of a portion of the force sensor coupled to both the cantilever body and the tip, relative to a portion of the force sensor coupled to and extending freely from the cantilever body.

18. The method of claim 16, wherein detecting the relative deflection of the force sensor includes detecting a variance in the intensity of light reflected from the force sensor that is due to the interaction of the tip with the sample.

19. The method of claim 16, wherein
oscillating the cantilever arrangement includes driving the cantilever close to its fundamental resonance frequency,
interacting the tip with a sample includes interacting the tip with a sample during a small fraction of the oscillation cycle, the force sensor exhibiting a response to the interaction that is out-of-phase, relative to the oscillating cantilever, and
detecting the relative deflection of the force sensor includes detecting the out-of-phase response, relative to the oscillations of the cantilever.

20. The method of claim 16,
further including aligning a diffracted mode of the force sensor to the center of a quadrant photodiode, and
wherein detecting the relative deflection of the sensor includes using a vertical displacement of a spot on the photodiode to detect cantilever oscillations, and using the power of light on the quadrant photodiode to detect the relative tip displacement due to interaction with the sample.

21. The method of claim 16, further including aligning two adjacent diffracted modes of the force sensor onto left and right halves of a quadrant photodiode to vertically center the modes, and
wherein detecting the relative deflection of the force sensor includes using a vertical difference signal from the photodiode to detect cantilever oscillations, and using a lateral difference signal from the photodiode to detect tip displacement relative to the cantilever body.

22. An atomic force microscopy cantilever arrangement comprising:
a cantilever body; and
a sensor arrangement, coupled to and extending from an end of the cantilever body, including
a tip structure, and
a mechanical resonator including
an uncoupled resonator finger having a first end connected to the cantilever body and another end extending freely from the cantilever body, and
a coupled resonator finger having a first end connected to the cantilever body and another end connected to the tip structure to flexibly displace, relative to the uncoupled resonator finger in response to interaction between the tip structure and a sample, the coupled resonator finger being configured and arranged to exhibit a resonance frequency that is about equal to a resonance frequency exhibited by the uncoupled resonator finger.

* * * * *